(12) United States Patent
Benavides Pérez et al.

(10) Patent No.: US 8,796,364 B2
(45) Date of Patent: Aug. 5, 2014

(54) METHOD FOR PREPARATION OF ADDITIVE FOR COATINGS CONTAINING METALLIC NANOPARTICLES

(75) Inventors: Ricardo Benavides Pérez, Torreon Coahuila (MX); José Gertrudis Bocanegra Rojas, Coahuila (MX); Jesús Manuel Martínez Martínez, Coahuila (MX); Julio César Rangel Mata, Coahuila (MX)

(73) Assignee: Servicios Administrativos Penoles S.A. de C.V., Coahuila (MX)

( * ) Notice: Subject to any disclaimer, the term of this patent is extended or adjusted under 35 U.S.C. 154(b) by 0 days.

(21) Appl. No.: 12/741,327

(22) PCT Filed: Nov. 5, 2007

(86) PCT No.: PCT/MX2007/000134
§ 371 (c)(1),
(2), (4) Date: May 4, 2010

(87) PCT Pub. No.: WO2009/061165
PCT Pub. Date: May 14, 2009

(65) Prior Publication Data
US 2010/0267859 A1      Oct. 21, 2010

(51) Int. Cl.
| | | |
|---|---|---|
| *C08K 5/34* | (2006.01) | |
| *C08K 5/48* | (2006.01) | |
| *C08K 3/08* | (2006.01) | |
| *C08K 3/10* | (2006.01) | |
| *C08K 3/18* | (2006.01) | |
| *C08K 3/22* | (2006.01) | |

(52) U.S. Cl.
USPC ............ 524/88; 524/406; 524/408; 524/413; 524/430; 524/434; 524/436; 524/437

(58) Field of Classification Search
USPC ........... 524/88, 406, 408, 413, 430, 434, 436, 524/437
See application file for complete search history.

(56) References Cited

U.S. PATENT DOCUMENTS

2008/0190325 A1 * 8/2008 Kohler et al. ................. 106/499

FOREIGN PATENT DOCUMENTS

WO      WO 2006131497 A1 * 12/2006

\* cited by examiner

*Primary Examiner* — Kriellion Sanders
(74) *Attorney, Agent, or Firm* — Michael J. Brown

(57) ABSTRACT

The present invention relates to a method of obtaining an additive for coatings that contains nanoparticles of one or more compounds, preferably metallic, selected in relation to the property that is desired to be transferred to the coating, which comprises a first pretreatment phase in which the water content of the active agent is reduced, replacing it with a vehicle compatible with the coating, and a second phase in which it is mixed with a resin compatible with the coating, a dispersant and a solvent, which are also compatible with it. The additive produced by this method contains nanoparticles of one or more compounds, preferably metallic, which become dispersed homogeneously in the coating once incorporated therein.

9 Claims, 1 Drawing Sheet

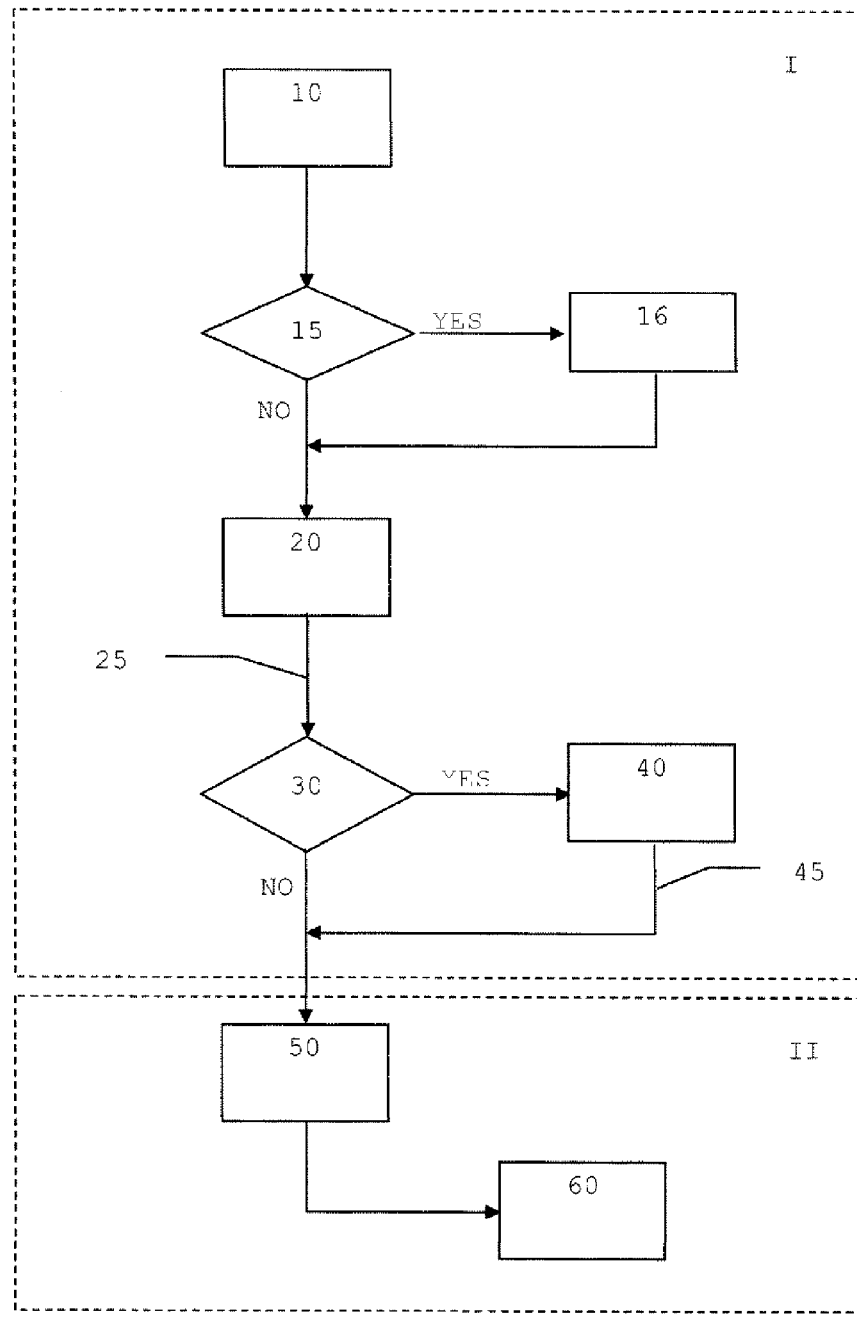

METHOD FOR PREPARATION OF ADDITIVE FOR COATINGS CONTAINING METALLIC NANOPARTICLES

TECHNICAL FIELD OF THE INVENTION

The present invention relates to additives that are used in paints and coatings, for the purpose of endowing them with desirable properties in relation to the final application, in particular the invention relates to an additive that contains nanoparticles of one or more compounds, preferably metallic, where the solvents, dispersants and surfactants that accompany them are selected depending on the nature of the paint or coating.

BACKGROUND OF THE INVENTION

The use of nanoparticulate compounds for modifying properties different from that of the intrinsic nature of paints, varnishes and coatings in general is known and has increased considerably in recent years.

For example, it is known that nanoparticles of metallic silver are used for conferring antibacterial properties on the materials in which they are incorporated, as is shown in the patents cited hereunder.

The use of some metals or their compounds, as agents that help to improve some of the desired properties in products such as coatings, paints and other polymeric mixtures, is common in everyday practice, for example, the use of silver as antibacterial is well known, and it is known that their effect improves substantially when they are of nanometric size. Although materials exist in which nanometric metallic silver is incorporated, said silver is deposited on inert substrates with a size of several microns, resulting in localized zones with a high concentration of nanoparticles.

Zinc oxide is known for its fungicidal effect, and is widely used in personal hygiene articles and skin medications. It is also known that in nanometric sizes it can absorb ultraviolet light, offering protection for materials that contain it. As with all nanometric compounds, better dispersion and controlled particle size offer advantages, since unprotected zones are practically eliminated.

The flame retardant effect of magnesium hydroxide is also known, and it has been observed that in nanometric sizes it offers advantages, for example of transparency, without affecting the mechanical properties of the coating in which it is used. This is embodied in patent application PCT/MX 2007/000046 (Martinez et al., 2007), which relates to a method for the preparation of a flame retardant additive for coatings and the resultant products.

Similarly, the properties of nanoparticles of Ag, Au, Cu, Bi, Mg, Zn, Sb, their oxides, hydroxides, sulfides, chlorides, sulfates, and mixtures thereof, are transferred to the coating of the final application.

Several examples have been found of coatings in which nanoparticles are incorporated to endow them with certain qualities or properties. The main problem to be tackled is the efficient dispersion of the nanoparticles in the application volume, because of the appearance of agglomerates that reduce their effectiveness.

The present invention describes an additive that ensures the homogeneous distribution and efficient dispersion of the nanoparticles throughout the coating. For greater clarity, in this document "additive" means a mixture or combination of components that is added to another substance to give it qualities that it lacks or to improve those that it already possesses. In particular the additive according to the invention is for application in coatings such as paints, varnishes and polymeric mixtures that are fluid at room temperature.

In the prior art there is a great variety of alternatives for incorporating nanoparticles in coatings, and thus provide them with certain properties intrinsic to said nanoparticles, some examples of which are mentioned below.

Patent CN 1850924 (Li, 2006) describes the production of an antibacterial coating containing silver nanoparticles. The additive is prepared using hydroxylated acrylic resin or an emulsion of acrylic acid polymer, starting from a 6% solution of silver nanoparticles in a polyethylene wax. The product obtained in this method cannot be made compatible with other systems and is limited to a maximum concentration of 6%.

Patent CN 1837035 (Wang et al., 2006) gives an account of a method of preparation of a hybrid carbon membrane that contains inorganic nanoparticles. The product of this invention is limited to just one type of application.

Patent JP 2005248136 (Ando, 2005) discusses an additive that contains nanometric silver for coatings, which prevents marine organisms adhering to surfaces. This invention is limited to the removal of marine organisms on surfaces submerged in water and to a paint for marine application.

Patent TW 220398 (Liang, 2004) discusses an additive that contains metallic nanoparticles, but which are synthesized directly in an organic solvent. Application of the product of this invention is limited to materials compatible with organic solvents and that can be synthesized therein.

Patent WO 2003103392 (Norminger et al. 2003) describes a coating that contains antibacterial metallic nanoparticles, but has the limitation that said nanoparticles are on other particles of titanium dioxide.

Publication US20070173564A1 (Sohn et al., 2007) relates to a composition for producing a transparent coating with a photocurable resin, which contains silver nanoparticles. The product of this invention is limited to silver nanoparticles in a photocurable transparent coating.

Publication US2006155033A1 (Sisson, 2006) describes an emulsion used for improving the electrical conductivity between contact surfaces, for example electrical connectors, and for protecting them against the effects of time. This coating is limited to the transfer of electrical properties and to the use of silver nanoparticles.

U.S. Pat. No. 6,855,749B1 (Yadav et al. 2005) is limited to a nanocomposite polymer that is mainly used as a material for biological uses in applications such as vehicles of medicinal products, biomedical devices, and implants of bones or teeth.

U.S. Pat. No. 6,228,904B1 (Yadav et al. 2001) relates specifically to a polymeric composite with nanomaterials with properties of resistivity, the method and the application of the mixture for producing a plastic with electrical properties. The teaching of this document is not directly applicable to fluid mixtures for coatings, as in our case, except that the properties in question are related to the electrical properties.

The additive of the present invention is designed for transferring, to a final coating, biocidal, UV protection, and flame retardant properties, and in general, selected properties intrinsic to the metals and compounds of Ag, Au, Cu, Mg, Zn, Bi, Sb; the additive includes the use of solvents, surfactants, dispersants and resins that make it compatible with the final coating. Said coating with additive ensures perfect distribution and dispersion of the nanoparticles throughout it, without the need for an inorganic substrate. The process for the manufacture of the additive starts from existing nanoparticles of the aforementioned metals and compounds, which can be in aqueous organic media or alternatively as dry powders, and are submitted to a treatment that allows them to be incorporated in coatings used in a wide variety of environmental conditions. The process can be used for obtaining a variety of functionalized additives.

OBJECTS OF THE INVENTION

One object of the present invention is to provide a composition for use as an additive in polymeric mixtures, such as paints, varnishes or coatings of a fluid nature, in which the properties desired in the final application are provided by metallic nanometric particles and their composites, selected specifically.

Another object of the present invention is that the nanoparticles of the additive that confer the properties on the coating are distributed homogeneously in the volume of the coating.

Another object of the present invention is to provide an additive in which the nanoparticles of the additive do not agglomerate, remaining dispersed throughout the shelf life, both of the additive and of the coating in which they are incorporated.

One more object of the present invention is that the properties desired in the coating can be obtained by the appropriate selection of nanoparticles of one or more metals and their compounds.

Yet another object of the present invention is to provide an additive in which the nanoparticles of metal or metal compounds do not require an additional carrier, such as ceramic materials, in order to remain unagglomerated.

These and other objects will become clear, to a person skilled in the art, on reading the description that follows.

BRIEF DESCRIPTION OF THE DRAWINGS

FIG. 1 is a block diagram that represents the process for production of the additive according to the invention.

DETAILED DESCRIPTION OF THE INVENTION

The additive prepared according to the method of the present invention is produced starting from metallic nanoparticles and their composites, with an average particle size that is selected in the range from 1 to 100 nanometers, preferably monodispersed, i.e. having a very narrow size variation, the particle size being a function of the desired application; for example, it is considered that in applications of the medical type, sizes less than 10 nm are preferred, and in UV protection sizes around 60 nm are preferred; and with a purity of at least 95%.

Selection of the material of the nanoparticles to be used in the formulation of the additive of the present invention is closely linked to the property that is desired in the final application, as can be seen from Table 1, which shows some examples that serve for determining the parameters recommended for obtaining the desired effects in the final application.

TABLE 1

Recommended selection of nanoparticles for preparation of the additive.

| Property | Ag° | Au° | Cu° | Bi° | Mg(OH)$_2$ | ZnO | AgS | Bi$_2$O$_3$ | Sb$_2$O$_5$ |
|---|---|---|---|---|---|---|---|---|---|
| A | X | | X | | | X | X | | |
| B | | | | | X | X | | X | |
| C | | | | | X | | | X | |
| D | X | | X | | | X | | | |
| E | X | X | X | X | | | | X | X |
| F | | | | X | X | | X | X | |

Where:
A: biocidal properties, such as bactericide, fungicide and algicide.
B: UV protection.
C: Flame retardant.
D: Fungicide.
E: Electrical conductivity.
F: Optical properties.

The nanometric particles selected according to Table 1 are submitted to a treatment for incorporating them in the final coating, for which it is possible to start from nanoparticles in aqueous, organic suspension or in powder form, without the compatibility between the vehicle of the nanoparticle and the base of the additive that is to be formulated being limiting, since an important part of the present invention is changing the vehicle in the additive to make it compatible with the final coating.

Referring to FIG. 1, which is a block diagram of the process for production of the additive of the invention, there are two zones, referenced with the numerals I and II: the first, made up of blocks (10) to (40), which represent a pretreatment of the nanoparticles, and the zone made up of blocks (50) and (60), representing the process of preparation of the additive as such.

In zone I or the pretreatment phase, block (10) represents the raw material, constituted of metal nanoparticles, their composites or mixtures thereof, which will be used for preparing the additive, preferably being a moist paste, although for some very specific applications that require absence of water, dry powder is preferred. As already mentioned, the nanoparticles have an average size in the range from 1 to 100 nanometers and a purity of at least 95%. This material is supplied to block (20).

Block (20) represents an operation designated "change of vehicle", in which the raw material is washed for the purpose of removing the water or solvent contained, depending on the case, and replacing it with a "compatible" solvent, i.e. it is incorporated without causing phase separation, with the solvent or thinner of the final application (the "target coating"), which in its turn will prevent the formation of lumps on coming into contact with the target coating; the process is carried out with vigorous stirring preferably for between 5 and 30 minutes, or for as long as is necessary. The mixture is stirred in turbulent conditions by means of a disperser with a shearing disk or other device that provides a peripheral speed of at least 2 m/s and up to 30 m/s as a maximum. After stirring, phase separation takes place and the process can be repeated until a residual moisture content of less than 5% is obtained in the solid phase.

When because of the nature of the solvent or thinner, and of the resin contained in the target coating, the nanoparticles might react, the need for the particles to undergo a surface treatment (16) prior to the operation of "change of vehicle" (20), using conventional surfactants compatible with the target coating, is evaluated as indicated by block (15).

The process of "change of vehicle" (20) has the purpose of ensuring that the nanoparticles will not agglomerate in the dispersion phase (50) of zone II, on being incorporated in the coating or on application of the latter on the surface to be treated.

Block (30) indicates that in the case when the residual moisture content tolerated in the additive is very low, close to zero, owing to the nature of the resin and solvents or thinners in the target coating and once the stage of "change of vehicle" (20) is completed, the residual moisture content in the solid phase is reduced by a drying process (40), taking care that the operating temperature in said drying is below the boiling point of the vehicle. The operation is continued until a residual moisture content tolerated by the target coating is obtained.

The result of operation (40) is a "dry" powder of nanoparticles, which can be stored for subsequent preparation of the additive. The product obtained by this method retains its properties during prolonged periods of storage.

If a moisture content of the order of 5% is tolerated in the final application, the drying stage represented by block (40) is omitted.

The product obtained, whether "dry" or moist, resulting from one of the two routes of the first phase of the process (25) or (45), is submitted to a process of dispersion (50), in zone II, which properly is identified with preparation of the additive ready for use in the target coating according to the present invention.

In this stage, the paste or the "dry" powder from block (20) or (40) is fed to a process of dispersion (50) in which a resin and a dispersant that are compatible with the target coating are added, according to Table 2:

TABLE 2

Recommended selection of the resin and the dispersant for preparation of the additive

| CATEGORY OF TARGET COATING | RESIN RECOMMENDED IN THE DISPERSION | DISPERSANT RECOMMENDED IN THE DISPERSION |
|---|---|---|
| Polyurethane | Polyester or aldehyde | copolymer with acid groups, alkylammonium salt of a polycarboxylic acid, alkylammonium salt of an unsaturated fatty acid, salt of unsaturated polyamine amides and acid polyesters of low molecular weight, unsaturated polyamine amide and acid polyesters of low molecular weight |
| UV curing | Epoxy-acrylate | copolymer with acid groups, alkylammonium salt of a polycarboxylic acid, alkylammonium salt of an unsaturated fatty acid, salt of unsaturated polyamine amides and acid polyesters of low molecular weight, salt of an unsaturated polyamine amide and acid polyesters of low molecular weight |
| Styrene - Acrylic | Styrene - Acrylic | ammonium salt of an acrylic copolymer, alkylammonium salt and a polyfunctional polymer of anionic character, sodium salt of an acrylic copolymer |
| Vinylic | Vinylic | ammonium salt of an acrylic copolymer, alkylammonium salt and a polyfunctional polymer of anionic character, sodium salt of an acrylic copolymer |
| Alkydalyl enamel | Alkydalyl resin | copolymer with acid groups, alkylammonium salt of a polycarboxylic acid, alkylammonium salt of an unsaturated fatty acid, salt of unsaturated polyamine amides and acid polyesters of low molecular weight, salt of an unsaturated polyamine amide and acid polyesters of low molecular weight |
| 0% Volatile organic compounds | Styrene - Acrylic, Vinylic, Epoxy-acrylate | ammonium salt of an acrylic copolymer, alkylammonium salt and a polyfunctional polymer of anionic character, sodium salt of an acrylic copolymer |
| Nitro-cellulosic | Stabilized alkydalyl or nitro-cellulose | copolymer with acid groups, alkylammonium salt of a polycarboxylic acid, alkylammonium salt of an unsaturated fatty acid, salt of unsaturated polyamine amides and acid polyesters of low molecular weight, salt of an unsaturated polyamine amide and acid polyesters of low molecular weight |
| Alkydalyl | Alkydalyl of soya, coconut, lecithin | copolymer with acid groups, alkylammonium salt of a polycarboxylic acid, alkylammonium salt of an unsaturated fatty acid, salt of unsaturated polyamine amides and acid polyesters of low molecular weight, salt of an unsaturated polyamine amide and acid polyesters of low molecular weight |
| Phenolic | Phenolic resin | copolymer with acid groups, alkylammonium salt of a polycarboxylic acid, alkylammonium salt of an unsaturated fatty acid, salt of unsaturated polyamine amides and acid polyesters of low molecular weight, salt of an unsaturated polyamine amide and acid polyesters of low molecular weight |

Dispersion (50) is carried out by means of a stirrer or disperser with a peripheral speed of between 15 and 30 m/s. The viscosity of the mixture is adjusted to that of the target coating by adding solvent or thinner, which preferably is the same as will be used with the coating or at least must be compatible with it. The percentage of dispersant in the mixture is maintained at between 0.5 and 10% depending on the nanoparticles in the dry base.

The product (60) obtained from the process of dispersion (50) is the additive of the invention, and can even be, in the preferred embodiment, a formulation with up to 99 wt. % of nanoparticles.

Among the advantages of the additive obtained by the method of the invention, there is the fact that as a result of the treatment of change of vehicle in stage (20) and mixing with resins and dispersants in stage (50), the product is completely compatible with the target coating for which it was prepared by selecting the appropriate resin and dispersant in accordance with Table 2 presented above, and selection of a suitable surfactant, when necessary, moreover maintaining a high degree of homogeneity in the dispersion of nanoparticles in the formulation, so that on being added to the target coating, the additive will be incorporated easily and quickly and this ensures that the particles will maintain their homogeneity of dispersion throughout the volume and, therefore, in the coating layer after application on the surface to be protected.

Example 1

Preparation of the Additive for Use in an Organic Matrix for Use in Polyester-Based Paint 1. Start with a paste of nanoparticles of metallic silver, with a water content of 64%, with a particle size distribution $D_{10}$, 16.3 nm; $D_{50}$, 23.9 nm; $D_{90}$, 43.5 nm; measured by photon correlation spectroscopy (PCS), in equipment of type MALVERN Zetasizer Nano ZS. For purposes of illustration, 300 grams is used.
2. Pour the paste of nanoparticles into a narrow-mouth beaker of the Berzelius type, equipped with a propeller disperser, add two volumes of cellosolve butyl solvent, equal to that of the paste. Disperse for 5 minutes.
3. Separate the nanoparticles from the mother liquor, by physical means (decanting, filtration, centrifugation, etc.). Retain the liquor for analysis of physical water by the Karl Fischer method. Weigh the amount of paste of nanoparticles obtained, to calculate the water content of the paste.
4. Repeat steps 2 and 3 as many times as necessary until, in the paste of nanoparticles, a water content of less than 5%, or that accepted for the final application, is reached.
5. Steps 2 and 3 are repeated 3 more times, but now the solvent is replaced with propylene glycol acetate methyl ether.
6. In a separate vessel, dissolve 125 grams of the polyester-based resin or some other that is compatible with this system, for example, Laropal® A 81 (BASF), with 100 mL of the solvent propylene glycol acetate methyl ether. Check for complete dissolution of the resin by conventional methods.
7. Disperse the paste of nanoparticles obtained in step 5, in the solution of resin and solvent from step 6, add 20 g of dispersant, from the selection recommended in Table 2. A peripheral speed of between 15 and 30 m/s for a period of between 5 and 30 minutes is recommended. Verify dispersion of the paste by known conventional methods.
8. Dilute the rest of the resin (375 grams) in the paste dispersed in step 7, add a further 400 mL of solvent propylene glycol acetate methyl ether. This is carried out for 1 hour at a peripheral speed of 5 m/s.
9. Adjust the paste to 1000 grams with solvent propylene glycol acetate methyl ether. Verify, in the paste, the percentage of nanoparticles, the percentage of total solids, density, viscosity, morphology by microscopy and physical moisture by Karl Fischer.

Example 2

Preparation of the Additive for Use in an Organic Matrix for Use in Polyurethane-Based Paint 1. Start with a paste of nanoparticles of metallic silver, with a water content of 64%, with a particle size distribution $D_{10}$, 16.3 nm; $D_{50}$, 23.9 nm; $D_{90}$, 43.5 nm; measured by photon correlation spectroscopy (PCS), in equipment of type MALVERN Zetasizer Nano ZS. For purposes of illustration, 300 grams is used.
2. Pour the paste of nanoparticles into a narrow-mouth beaker of the Berzelius type, equipped with a propeller disperser, add two volumes of cellosolve butyl solvent, equal to that of the paste. Disperse for a period of 5 minutes.
3. Separate the nanoparticles from the mother liquor, by physical means (decanting, filtration, centrifugation, etc.). Retain the liquor for analysis of physical water by the Karl Fischer method. Weigh the amount of paste of nanoparticles obtained, to calculate the water content of the paste.
4. Repeat steps 2 and 3 as many times as is necessary until, in the paste of nanoparticles, a water content of less than 5% or that accepted for the final application is reached.
5. In a separate vessel dissolve 125 grams of the polyurethane-based resin or some other that is compatible with this system, for example, Laropal® A 81 (BASF), with 100 mL of the cellosolve butyl solvent. Check for complete dissolution of the resin by conventional methods.
6. Disperse the paste of nanoparticles obtained in step 5, in the solution of resin and solvent from step 6, add 20 g of dispersant, from the selection recommended in Table 2. A peripheral speed of between 15 and 30 m/s for a period of between 5 and 30 minutes is recommended. Verify the dispersion of the paste by known conventional methods.
7. Dilute the rest of the resin (375 grams) in the paste dispersed in step 7, add a further 400 mL of cellosolve butyl solvent. This is carried out for 1 hour at a peripheral speed of 5 m/s.
8. Adjust the paste to 1000 grams with cellosolve butyl solvent. Verify, in the paste, the percentage of nanoparticles, the percentage of total solids, density, viscosity, morphology by microscopy and physical moisture by Karl Fischer.

As will be evident to a person skilled in the art, the process described for the production of the additive according to the present invention can be used for obtaining suitable additives that confer desired properties in the final application, by selecting the compound or mixture of compounds according to Table 1, without the need to modify the method. It will also be evident that other elements or their compounds can be used for conferring these or other properties in the same method of manufacture.

Having described the invention, what is considered novel and therefore claimed as property is:

1. A method of preparation of an additive to be incorporated in coatings to protect surfaces, the additive having silver nanoparticles as an active agent, said method comprises:
   (a) a first phase of pre-treatment of said active agent; and
   (b) a second phase of preparing of said additive;

wherein the first phase comprises the steps of:
  i) providing an aqueous composition of silver nanoparticles, said silver nanoparticles having an average particle size between 1 nm and 100 nm;
  ii) displacing the water contained in the aqueous composition of silver nanoparticles by means of stirring said aqueous composition of silver nanoparticles and an organic solvent added thereto at least between 5 and 30 minutes, in order to substitute the contained water with the organic solvent, providing a solid phase of said silver nanoparticles, with which a change of solvent is carried out;
  iii) drying said solid phase of silver nanoparticles to a lower temperature than the boiling temperature of said organic solvent, in order to obtain dried silver nanoparticles having an average particle size of 1 nm to 100 nm, and a purity of at least 90%;

wherein the second phase comprises the steps of:
  iv) dispersing the dried silver nanoparticles by means of a stirrer, mixing the dried silver nanoparticles with a resin, a dispersant and a solvent, wherein the stirrer operates at a peripheral velocity from 5 m/s to 30 m/s, and wherein said resin and dispersant are compatible with said coating in order that said additive is quickly and easily integrated to said coating by means of adjusting the viscosity of said additive to that of said coating;
  v) removing the finished additive from the stirrer.

2. The method of preparation of an additive of claim 1, wherein the resin is selected from the group consisting of Polyester, aldehyde, Epoxy-acrylate, Styrene-Acrylic, Vinylic, Alkyd resin, Stabilized alkyd, nitro-cellulose, Alkyd of soya, Alkyd of coconut, Alkyd of lecithin, and Phenolic resin.

3. The method of preparation of an additive of claim 1, wherein the dispersant is selected from the group consisting of Copolymer with acid groups, Alkylammonium salt of a policarboxylic acid, Alkylammonium salt of an unsaturated fatty acid, Salt of polyamine of an unsaturated polyamine amides, Acid polyesters of low molecular weight, Unsaturated polyamine amide, Salt of an unsaturated polyamine amides, Ammonium salt of an acrylic copolymer, Alkylammonium salt, polyfunctional polymer of anionic character and sodium salt of an acrylic copolymer.

4. The method of preparation of an additive of claim 1, wherein prior to the step of displacing the water, the method further comprises the step of providing a surface treatment adding surfactants to the silver nanoparticles compatible with the coating.

5. The method of preparation of an additive of claim 1, wherein the percentage of dispersant in the mixture is maintained between 0.5 and 10% based on the active agent.

6. The method of preparation of an additive of claim 1, wherein the product obtained is an additive that contains up to 99 wt. % of nanometric compound as active agent.

7. The method of preparation of an additive of claim 1, wherein the active agent further comprises a metal selected from group consisting of Ag, Au, Cu, Bi, $Mg(OH)_2$, ZnO, AgS, $Bi_2O_3$, $Sb_2O_5$ and mixtures thereof.

8. The method of preparation of an additive of claim 1, wherein the active agent resulting from the step of drying is a dry powder of silver nanoparticles.

9. The method of preparation of an additive of claim 1, wherein the aqueous composition of silver nanoparticles is provided as a paste of raw material.

* * * * *